(12) United States Patent
Curatu et al.

(10) Patent No.: US 7,522,344 B1
(45) Date of Patent: Apr. 21, 2009

(54) PROJECTION-BASED HEAD-MOUNTED DISPLAY WITH EYE-TRACKING CAPABILITIES

(75) Inventors: Costin E. Curatu, Oviedo, FL (US); Jannick P. Rolland, Chuluota, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 122 days.

(21) Appl. No.: 11/635,989

(22) Filed: Dec. 8, 2006

Related U.S. Application Data

(60) Provisional application No. 60/750,204, filed on Dec. 14, 2005.

(51) Int. Cl.
*G02B 27/12* (2006.01)
*G09G 5/00* (2006.01)

(52) U.S. Cl. .......................... 359/634; 345/8
(58) Field of Classification Search ......... 359/629–634; 345/7–9
See application file for complete search history.

(56) References Cited

U.S. PATENT DOCUMENTS

| | | | |
|---|---|---|---|
| 5,572,229 A | 11/1996 | Fisher | 345/8 |
| 5,621,572 A | 4/1997 | Ferguson | 359/630 |
| 6,578,962 B1* | 6/2003 | Amir et al. | 351/209 |
| 6,774,869 B2* | 8/2004 | Biocca et al. | 345/8 |
| 7,119,965 B1* | 10/2006 | Rolland et al. | 359/630 |
| 2004/0080467 A1* | 4/2004 | Chinthammit et al. | 345/7 |
| 2006/0110008 A1* | 5/2006 | Vertegaal et al. | 382/103 |

OTHER PUBLICATIONS

C. Cruz-Neira et al., Surround-screen projection-based virtual reality: the design and implementation of the CAVE, Conference of Computer Graphics, Anaheim, CA (1993), Proc. Of ACM SIGGRAPH 93, pp. 135-142.
K.F. Arrington, and G.A. Geri, "Conjugate-Optical Retroreflector Display System: Optical Principles and Perceptual Issues," Journal of the SID, (Aug. 2000), pp. 9-10.
H. Hua, Y. Ha, and J.P. Rolland, Design of an ultralight and compact projection lens, Applied Optics, vol. 42, No. 1, (Jan. 2003).
J.P. Rolland, A. Yoshida, L.D. Davis, J.H. Reif, High-resolution inset head-mounted display, Applied Optics, vol. 37, No. 19, (Jul. 1998) pp. 4183-4193.

* cited by examiner

*Primary Examiner*—Alicia M Harrington
(74) *Attorney, Agent, or Firm*—Brian S. Steinberger; Phyllis K. Wood; Law Offices of Brian S. Steinberger, P.A.

(57) ABSTRACT

Methods, systems, apparatus and devices for the lens design of an HMPD with eye-tracking capabilities. The integration uses a low-level optical configuration in order to achieve a compact, comfortable, easy-to-use system. The optical system is further designed and optimized for sharing of the optical path between the HMD and the Eye-Tracker with minimal performance loss for both tasks.

18 Claims, 12 Drawing Sheets

PROJECTION-BASED HEAD-MOUNTED DISPLAY WITH EYE-TRACKING CAPABILITIES

This application claims the benefit of priority to U.S. Provisional Patent Application No. 60/750,204 filed on Dec. 14, 2005.

FIELD OF THE INVENTION

This invention relates to head mounted displays and, in particular, to methods, systems, apparatus and devices for projection based head mounted displays with eye tracking capabilities.

BACKGROUND AND PRIOR ART

Head mounted displays are widely used for three-dimensional (3D) visualizations tasks such as simulators, surgery planning, medical training, and engineering design. Traditionally the head mounted display technology has been based on eyepiece optics. Issues associated with an eyepiece-based system include lack of compactness and large distortion for wide field of view designs, because the aperture stop of the system is located outside of the lens which has promoted other designs such as the head-mounted projection displays.

Head mounted projection display is a technology that is positioned at the boundary between conventional head mounted displays and projection displays such as the computer-automated virtual environment (CAVE). U.S. Pat. No. 5,621,572 issued to Fergason on Apr. 15, 1997 describes an optical system for head mounted display using retroreflectors and discloses a method of displaying an image. Other head mounted projection displays include R. Kijima and T. Ojika, Transition between virtual environment and workstation environment with projective head-mounted display, Proceeding of the IEEE 1997 Virtual Reality Annual International Symposium, Los Alamitos, Calif., pp. 130-137 and C. Cruz-Neira et al., Surround-screen projection-based virtual reality: the design and implementation of the CAVE, Conference of Computer Graphics, Anaheim, Calif. (1993), Proc. Of ACM SIGGRAPH 93, pp. 135-142.

A head mounted projection display (HMPD) consisting of a pair of miniature projections lenses, beam splitters, miniature displays mounted on the helmet, and a flexible, non distorting retro-reflective sheeting material strategically placed in the environment is described in U.S. Pat. No. 5,572,229 issued to Fisher on Nov. 5, 1996 which discloses a head-mounted projection display system using a beam splitter and method of making same. K. F. Arrington, and G. A. Geri, "Conjugate-Optical Retroreflector Display System: Optical Principles and Perceptual Issues," Journal of the SID, August 2000, pp. 9-10 describes systems wherein an image on the micro-display is projected through the lens onto the material, and then it is retro-reflected back to the entrance pupil of the eye, which is conjugate to the exit pupil of the optics through the beam splitter.

The HMPD technology has a few distinguishing advantages over conventional eyepiece HMDs as described in H. Hua, Y. Ha, and J. P. Rolland, Design of an ultralight and compact projection lens, Applied Optics, Vol. 42, No. 1, (January 2003). Along with the see-through capability which allows optical augmentation of the real world (augmented reality), the HMPD also provides correct occlusion of computer generated content by real objects. A real object placed between the beam splitter and the retro-reflective sheeting will effectively block rays thus providing occlusion of the virtual image. Because of its flexibility, the retroreflective material can be applied anywhere in the physical space and can be tailored to arbitrary shapes without introducing additional distortion. Compared to conventional eyepiece-based see-through HMDs, utilization of projection optics allows for reduced optical distortion across similar fields of view and an increase in the field of view without sacrificing compactness, since the size of the optics does not scale with field of view.

While head-mounted display technologies have undergone significant developments in the last decade, they have suffered from tradeoffs and limitations in capability, which impose critical effects on visualization accuracy and user performance. Among the tradeoffs and limitations, the ignorance of eye movement is often an overlooked aspect. The functional benefits of an integrated HMPD with eye tracking capability solution for human-computer, multi-modal interfaces, and gaze-contingent foveated displays have been recognized, but very few efforts have been made towards a low-level integration.

SUMMARY OF THE INVENTION

A primary objective of the invention is to provide methods, systems, apparatus and devices for a Head-Mounted Projection Display (HMPD) with eye-tracking capabilities.

A secondary objective of the invention is to provide methods, systems, apparatus and devices for a head-mounted projection display with eye-tracking capabilities that is a fully integrated system that is robust, easy to calibrate, inexpensive, and lightweight.

A third objective of the invention is to provide methods, systems, apparatus and devices for a head-mounted projection display with eye-tracking capabilities wherein the integration is performed from a low-level optical configuration in order to achieve a compact, comfortable, easy-to-use system.

A fourth objective of the invention is to provide methods, systems, apparatus and devices for a head-mounted projection display with eye-tracking capabilities wherein the full integration consists of sharing the optical path between the head mounted display and the eye-tracker.

A fifth objective of the invention is to provide methods, systems, apparatus and devices for a head-mounted projection display with eye-tracking capabilities with alternative hardware configurations for the lens design and optimization and system level issues such as eye illumination are varied to meet alternative system requirements.

A first embodiment provides a projection-based head-mounted display device with eye-tracking capability. The device includes multiple light sources for providing an infrared light to illuminate an eye of a user, a camera for recording the eye, an optics for providing an optical path for a head-mounted display path and an eye-tracker path, a first and a second optical device for imaging the eye to the camera positioned to reflect the infrared light and transmit a visible light, an interface for coupling a controller with the head-mounted projection display for executing a set of instructions for controlling the projection-based head-mounted display device, and a display for displaying an image to the user, wherein the projection-based head-mounted display with eye-tracking capabilities is compact, light-weight, comfortable and easy-to-use. The first and second optical device is selected from the group of a hot mirror and a beam-splitting cube and the multiple light sources include a dual light source for obtaining a bright pupil image and a dark pupil image of the eye, wherein the bright pupil image and the dark pupil image are subtracted to obtain a pupil of the eye for eye tracking. In an embodiment, the dual light source includes an on-axis light source, wherein a first infrared light from the on-axis light source is on the same axis as the camera to obtain the bright pupil image and an off-axis light source, wherein a second infrared light from the off-axis light source is off-axis from the camera to obtain the dark pupil image, wherein the bright pupil image and the dark pupil image alternate with each frame taken by the camera.

A second embodiment provides a method for providing eye-tracking in a projection-based head-mounted display. The method includes providing an infrared light from a light source for illuminating a pupil of a user's eye, using an optical device to create a head-mounted display optical path and an eye-tracking optical path, wherein the head-mounted display and the eye-tracking optical paths are shared to reduce weight of the projection based head-mounted display, recording a bright pupil image and a dark pupil image created by the infrared light using a camera, and extracting an eye movement data from the bright pupil image and the dark pupil image using a pupil/glint method. The eye movement extracting comprises the steps of creating plural glints in an eye of a user using the infrared light and calculating a centroid of the shape formed by the plural glints from the bright pupil image and the dark pupil image for tracking the eye movement. The method further comprises using a first and a second infrared light source having a first and a second infrared light output, respectively, positioning the first infrared light source to provide a first infrared light on-axis with a point of view of the camera, positioning the second infrared light source to provide a second infrared light off-axis with the point of view of the camera, recording the bright pupil image and the dark pupil image of a user's eye using the camera, wherein the on-axis light source creates the bright pupil image and the off-axis light source creates the dark pupil image, and subtracting the bright pupil image and the dark pupil image for use tracking eye movement, wherein the bright and the dark pupil images are synchronized to alternate with each frame taken by the camera to improving eye-tracking during rapid eye movement.

In an embodiment, the method further includes simultaneously optimizing the optical device for the head-mounted display path and the eye-tracking path using a zoomed configuration. The optimizing step of the method includes adjusting respective wavelength weights for the head-mounted display path and the eye-tracking path according to a spectral eye response and a infrared wavelength and weighting an extended visible-infrared spectrum across the zoomed configuration to optimize obtain best balanced performance for both the head-mounted display path and the eye-tracking path.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed description to identify components:

| | |
|---|---|
| 10 eye | 51 first reflection |
| 20 cornea | 52-54 reflections |
| 30 lens | 100 eye |
| 105 light pupil | 300 top mirror |
| 110 dark pupil | 305 on-axis LED |
| 120 glint | 310 bottom mirror |
| 200 system | 315 off-axis LED |
| 210 mirror | 320 beam splitter |
| 220 camera | 330 camera plane |
| | 340 micro display |

Several ways of tracking the eye-gaze direction exist. These methods can be divided into three main categories as described in Andrew T. Duchowski, Eye Tracking Methodology—Theory and Practice, Springer (2003). The first one is the contact lens method in which the user is required to wear special contact lenses that contain micro-induction coils. The exact position of the lens can then be recorded using a high-frequency electromagnetic field created around the user's head. The second method, the electro-oculography technique, is based on the existence of an electrostatic field that rotates along with the eye. It consists in recording very small differences in the skin electric potential around the eye with the help of electrodes placed on the skin. The third method, and the most commonly used one, is the video-oculography technique based on illuminating the eye with near infrared (NIR) light and taking video images of the eye while performing a real time image-processing algorithm for extraction of features such as eye pupil centroid. The first two techniques are undoubtedly quite intrusive for the user therefore, the projection-based head-mounted display of the present invention teaches use of a video-based technique.

Within the video-based technique, there are various ways of tracking the eye movements. The types differentiate from each other in the way the eye illumination is performed and in the way the features of the eye are extracted by the image-processing algorithm. One method tracks the eye movement by extracting the limbus, which is the boundary between the white sclera and the darker iris of the eye. Another method tracks only the pupil by extracting the boundary between the pupil and the iris. A third and more precise method uses infrared light to illuminate the eye and tracks the gaze direction by measuring the relative position of the pupil with respect to the glint produced by directing the infrared light onto the cornea.

Figure 1:
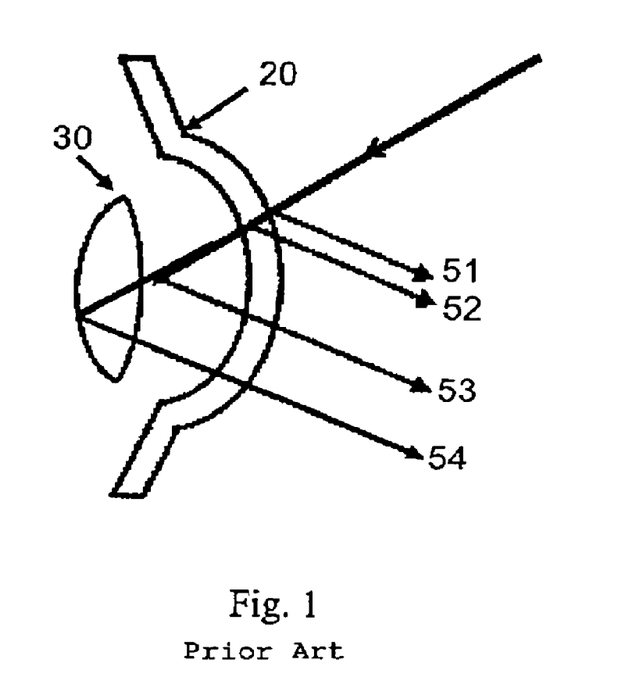
FIG. 1 shows the Purkinje eye reflections that occur at the boundaries of the cornea and eye lens when an infrared light is directed toward the user's eye.
Figure 2A:
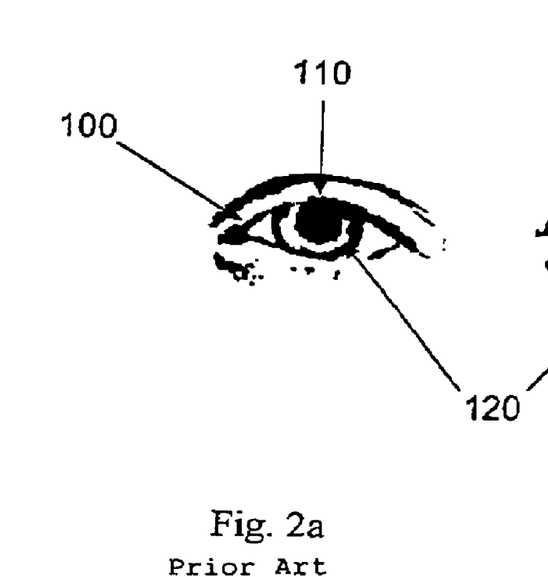
FIGS. 2a and 2b show a dark and a light pupil image, respectively, with glints.
Figure 2B:
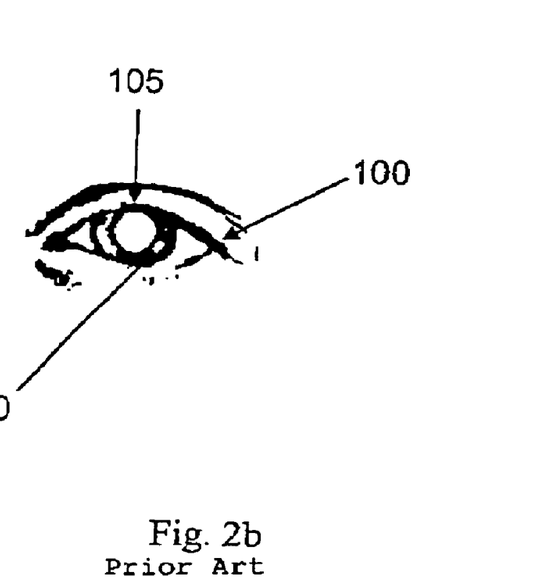

When infrared light is shone into the user's eye, several reflections 51-54 occur at the boundaries of the cornea 20 and eye lens 30, known as the Purkinje images, as shown in FIG. 1. The first Purkinje image, often called the glint, is the first reflection 52 off the cornea 20 and it remains quasi-stationary for reasonable eye movements (±15°), thus it can be used as a reference point in relation to the moving pupil for more accurate tracking. The pupil/glint tracking method requires the image-processing algorithm to locate both the eye pupils 105 and 110 and the glint 120 as shown in FIG. 2, extract their respective centroids, and calculate the gradient vector between the two.

The present invention is based on the pupil/glint method using multiple infrared LED sources for increased illumination uniformity and enhanced reference point extraction. Creating multiple glints, four in the preferred embodiment, reduces the burden of a highly accurate extraction of a single glint centroid. Instead the centroid of the polygon formed by the multiple glints is calculated, reducing the error by averaging, especially for larger angle eye movements, as described in C. H. Morimoto, D. Koons, A. Amir, M. Flickner, "Pupil Detection and Tracking Using Multiple Light Sources", Image and Vision Computing 18, (2000), pp. 331-335.

Moreover, the pupil extraction is improved by using a dual light source technique first disclosed by Ebisawa and described in Y. Ebisawa, Improved video-based eye-gaze detection method, IEEE Transactions on Instrumentation and Measurement, Volume 47, Issue 4, August 1998 pp. 948-955. This technique consists of obtaining both bright pupil 105 and dark pupil 110 images of the eye 100, as shown in FIG. 2, in subsequent frames and performing a subtraction of the two images in order to extract the pupil. The main advantage in using the difference image when performing the pupil extraction algorithm, is that the background almost vanishes, enabling an easier thresholding and artifact removal process. When the eye is illuminated with a light source the light that enters the pupil is reflected on the same path back towards the source due to the retroreflective properties of the retina. Therefore, if one of the infrared sources is placed on the same axis with the point of view of the camera, the image obtained will present a bright pupil 105. If on the other hand the light source is off-axis, the image will contain a dark pupil 110 eye, as shown in FIG. 2.

For this technique, both on-axis and off-axis illumination schemes are employed, and they are synchronized to alternate with each frame taken by the camera. Since the gaze direction is computed based on two consecutive images of the eye, the frame rate of the camera is relatively high in order to prevent pupil loss or tracking accuracy during rapid eye movement.

The projection-based head-mounted display with eye-tracking capabilities integrates the low-level optical configuration to achieve a compact, comfortable, easy-to-use, high fidelity and robust system. Compactness is often an issue in HMD design alone therefore, full integration consists of sharing the optical path between the HMD and the eye-tracker as much as possible to obtain a more compact designs. Sharing the optical path between the HMD and the eye-tracker minimizes the helmet weight and optimizes ergonomic factors.

Figure 3:
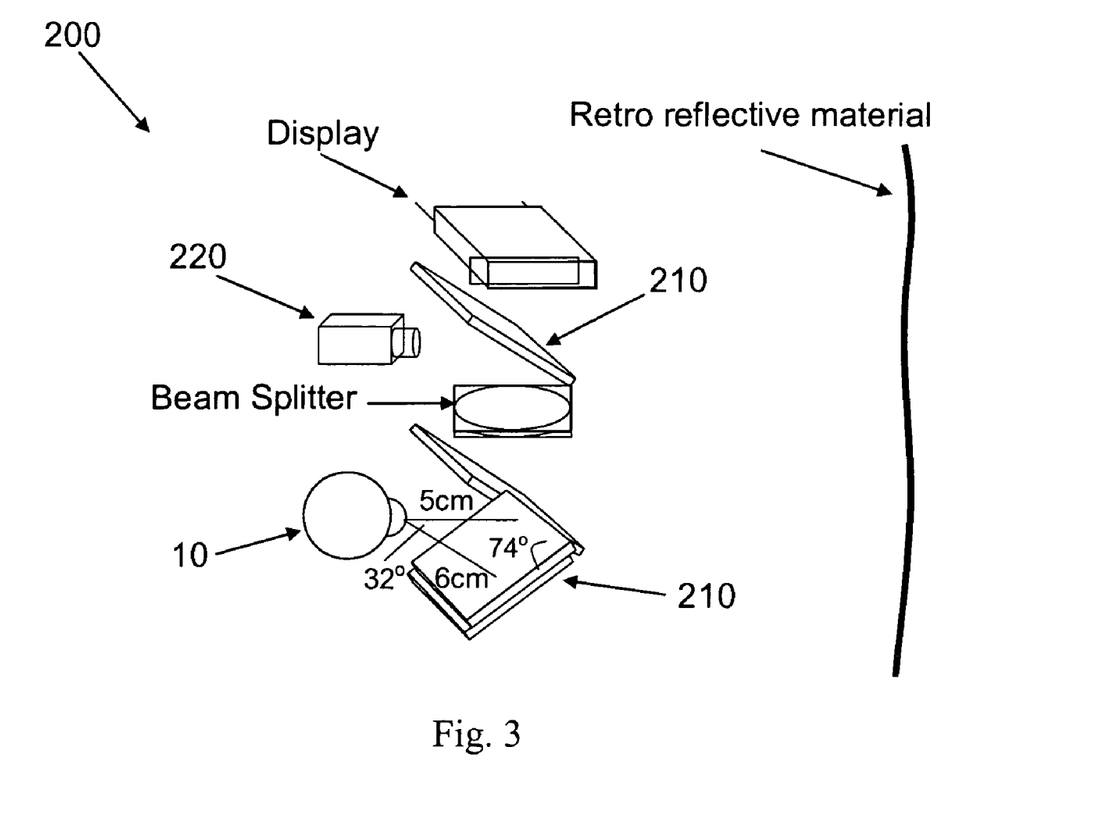
FIG. 3 shows a schematic representation of the projection-based head-mounted display with eye tracking capabilities according to the present invention.

The present projection-based head-mounted display integrates the eye-tracking system without obstructing the user's view. The HMPD path is essentially unchanged from earlier projection HMD designs. However, in the preferred embodiment of the invention the system 200 also includes two hot mirrors 210 for reflecting infrared and transmitting visible light, a camera 220 to capture the eye and infrared LEDs are used to illuminate the eye. FIG. 3 shows a schematic sketch of the configuration without the infrared LEDs.

Figure 4:
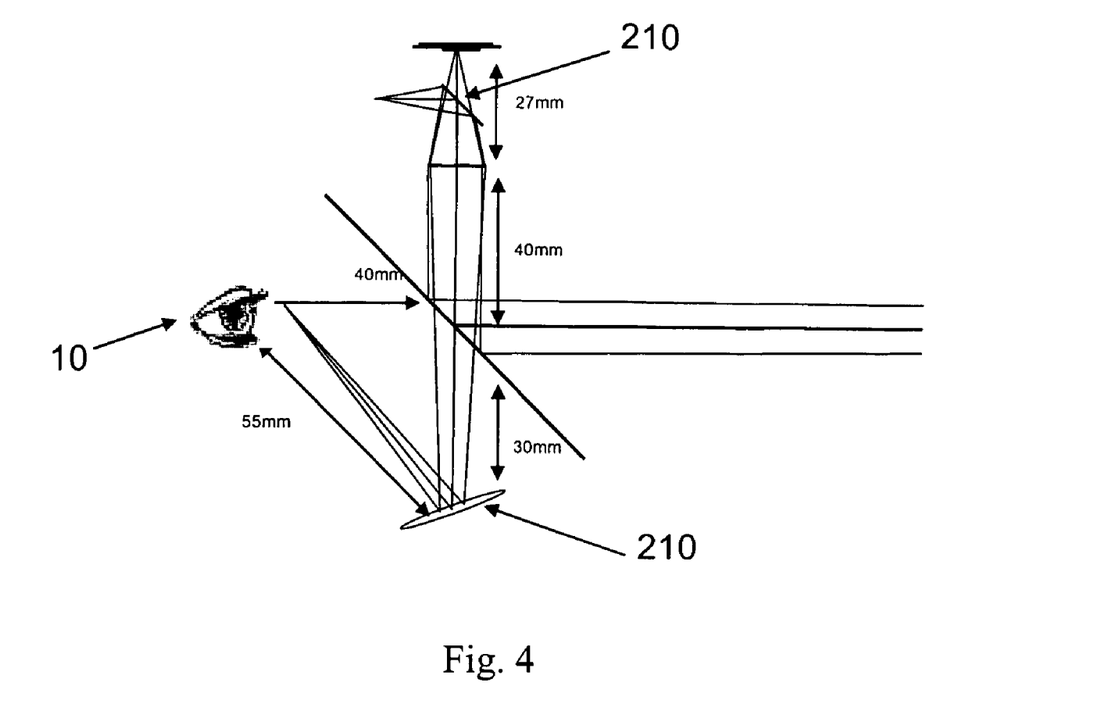
FIG. 4 shows the first order (on-axis) layout of the optical system according to the present invention.
Figure 5A:
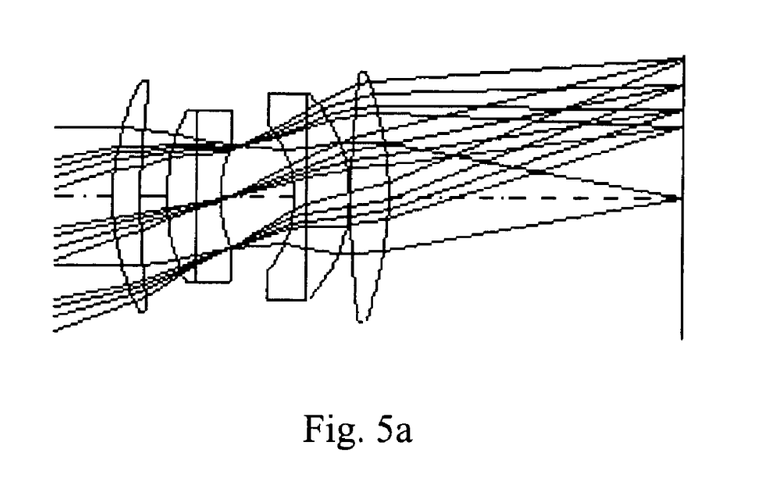
FIG. 5a shows the optical layout for the head-mounted projection display.
Figure 5B:
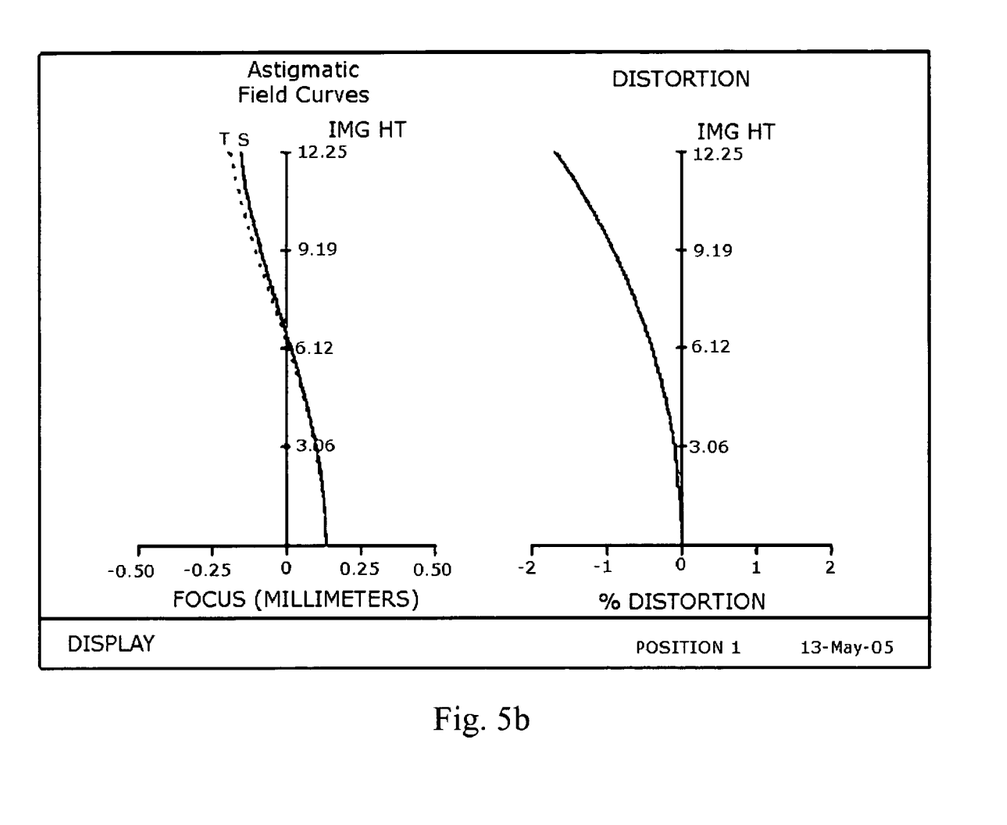
FIG. 5b is a graphical representation astigmatism and distortion plots for the head-mounted projection display path.
Figure 5C:
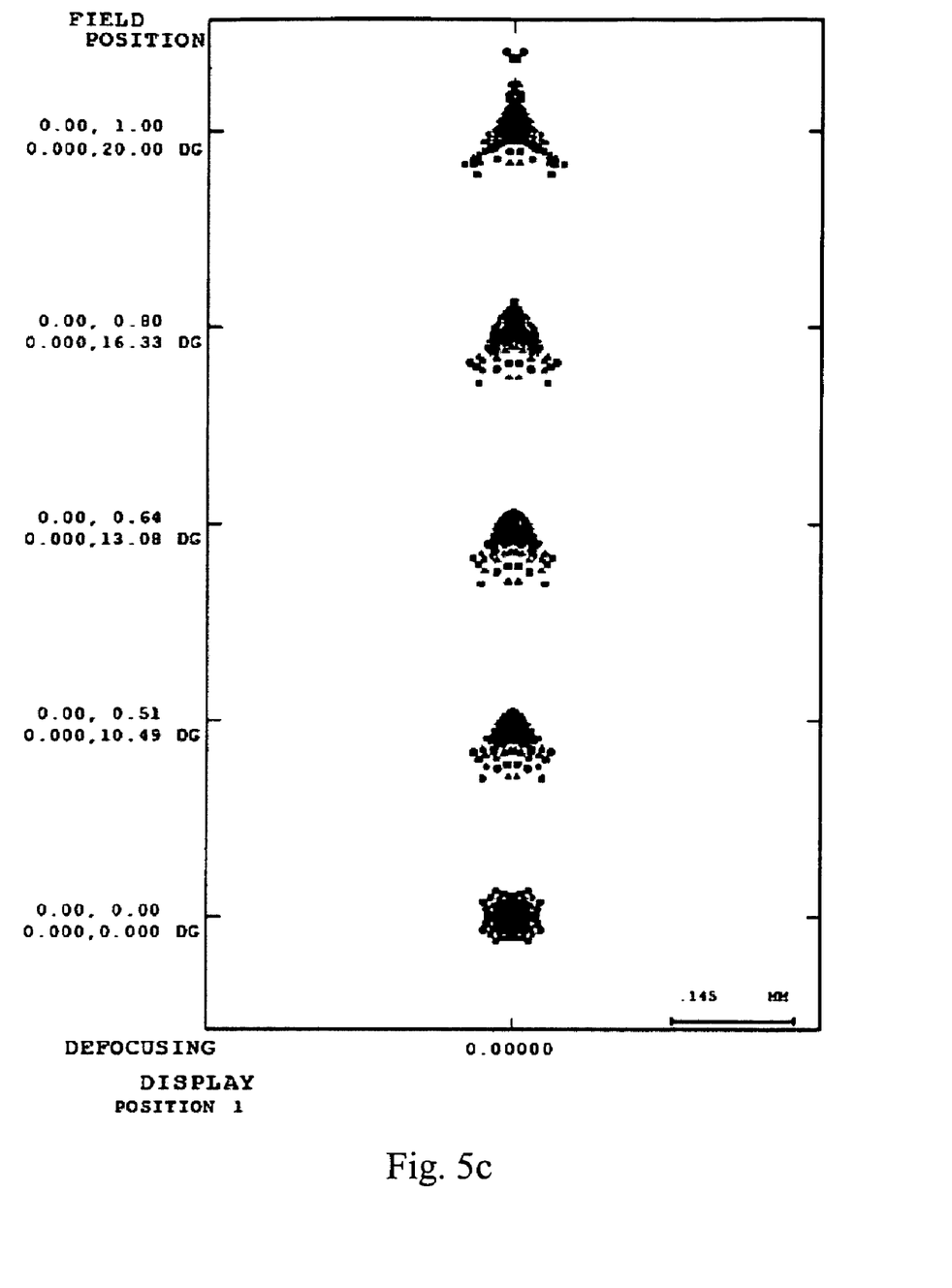
FIG. 5c is a spot diagram across five field angles.
Figure 5D:
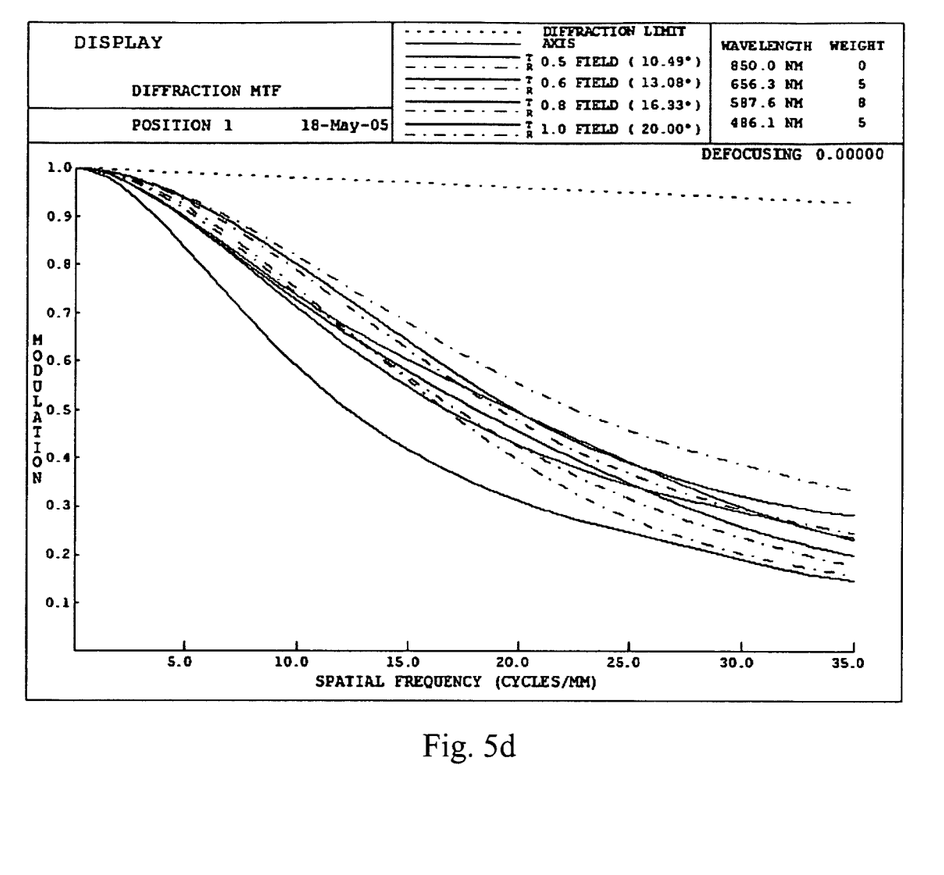
FIG. 5d is a graph of the MTF as a function of spatial frequency.
Figure 6A:
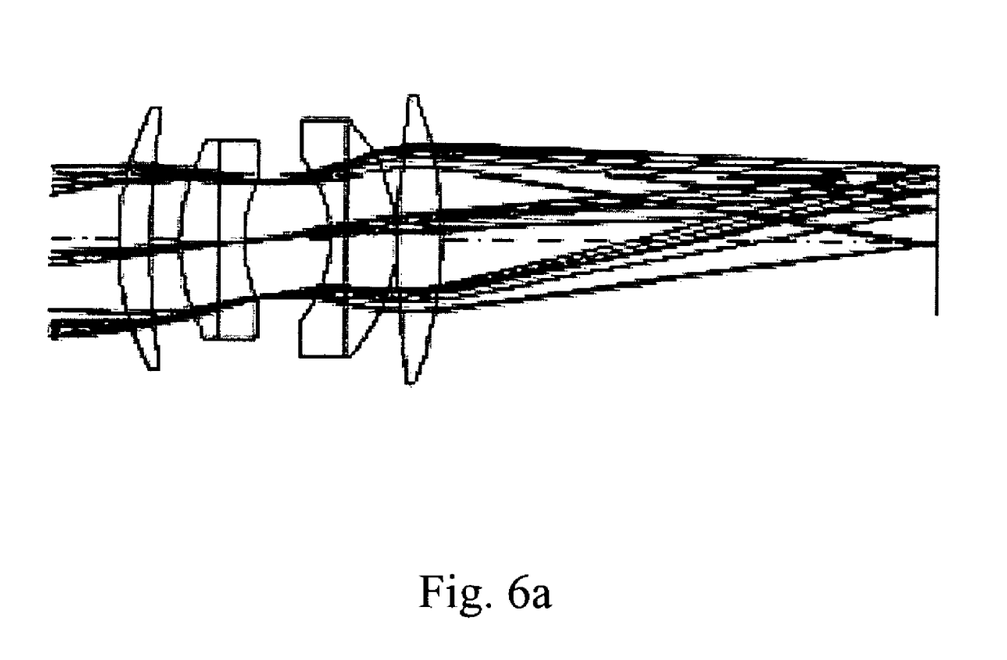
FIG. 6a shows the optical layout for the eye-tracking path.
Figure 6B:
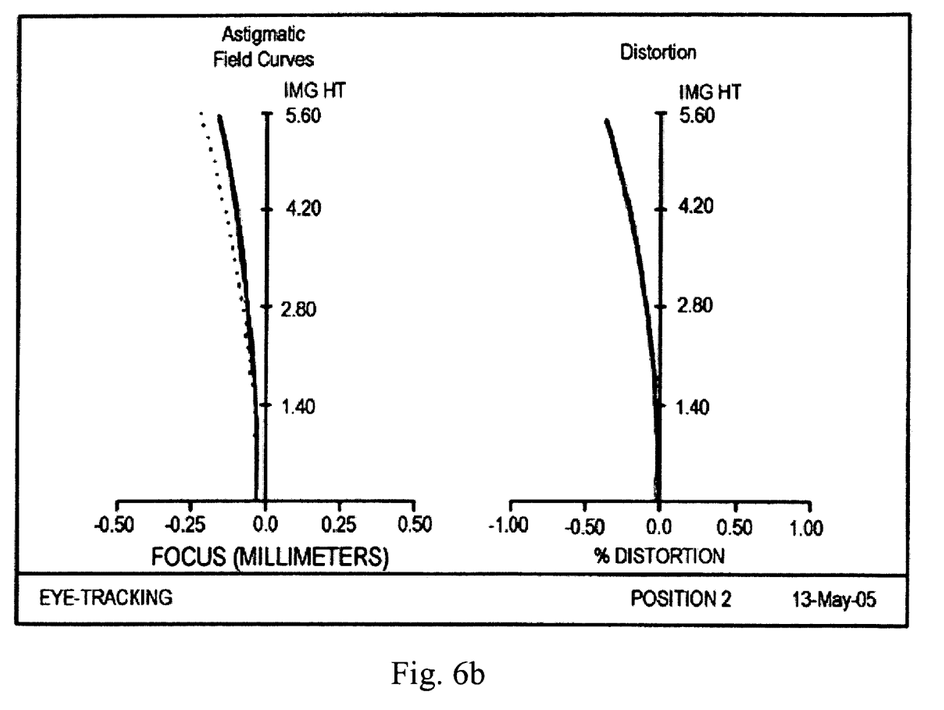
FIG. 6b is a graphical representation of astigmatism and distortion plots of the eye-tracking path.
Figure 6C:
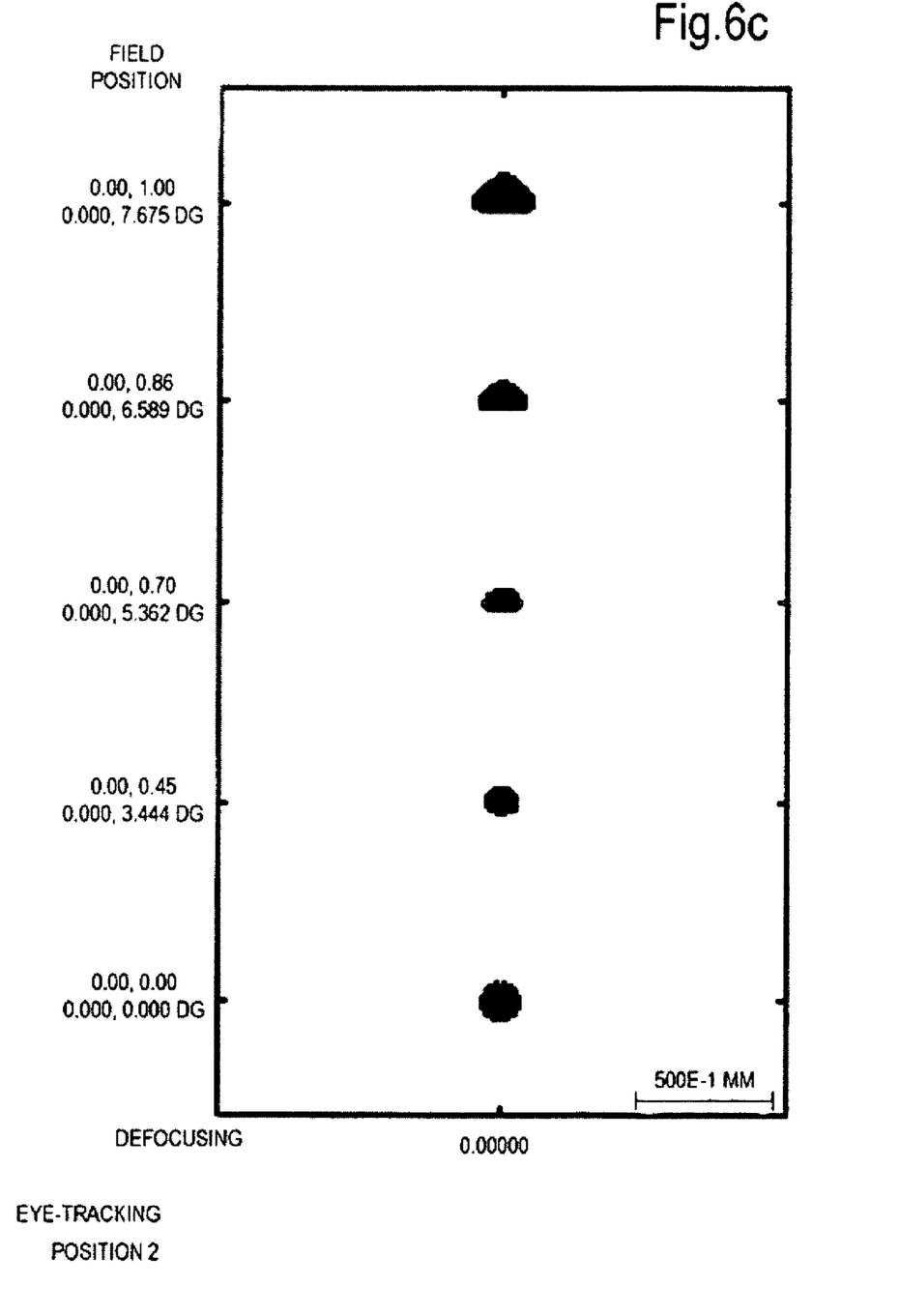
FIG. 6c is a spot diagram across five field angles of the eye-tracking path.
Figure 6D:
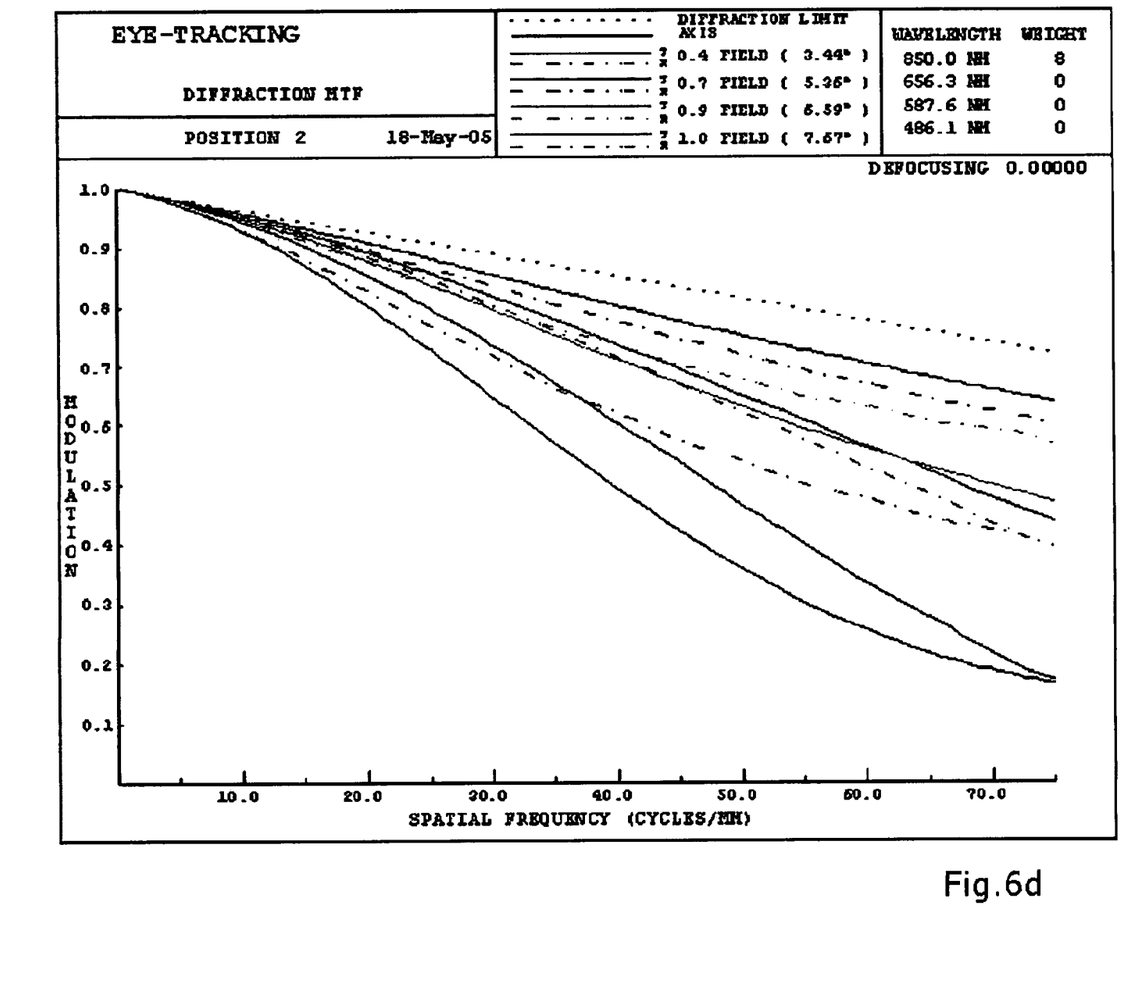
FIG. 6d is a graph of the MTF as a function of spatial frequency of the eye-tracking path.

The first order layout is illustrated in FIG. 4 using an ideal lens module. For simplicity, the on-axis paths shown and the distances are approximate. The distances change slightly due to mechanical and geometrical constraints, and also change during lens optimizations. The effective focal length (EFL) of the ideal lens is approximately 33 mm, yielding a diagonal full field of view of approximately 40° for the HMPD. The first order specifications for the two paths in this example are shown in Table 1.

TABLE 1

|  | HMPD | EYE-TRACKING |
| --- | --- | --- |
| Working distances with respect to the lens | OBJ distance: Infinity IMG distance: 30 mm | OBJ distance: 136 mm IMG distance: 33 mm |
| EFL | 33 mm | 33 mm |
| Full OBJ/IMG heights | OBJ height: 40° IMG height (display diagonal size): 24.6 mm | OBJ height: 35 mm (includes eye and partial surrounding lashes) IMG height (camera diagonal size): 11.2 mm |
| Entrance pupil | 12 mm | 12 mm |
| Wavelength | Visible | 850 nm |

The next step is replacing the thin ideal lens with a real projection lens. A double Gauss configuration described in J. P. Rolland, A. Yoshida, L. D. Davis, J. H. Reif, High-resolution inset head-mounted display, Applied Optics, Vol. 37, No. 19, July 1998 is used in the preferred embodiment of the present invention. The double Gauss lens is scaled to an effective focal length of approximately 33 mm and optimized for the HMPD path. The projection display path is similar to prior art HMPD configurations with the additional constraint that the back focal length of the lens, the distance from the last surface to the micro-display remains large enough to allow the addition of the hot mirrors for the eye-tracking path.

As shown in FIG. 3, the eye-tracking path uses the two hot mirrors 210 to image the eye 10 onto the camera 220. It uses the same lens as the HMPD for imaging, only at different conjugates and at a different wavelength. The hot mirrors 210 and the camera 220 are placed at angles such that the geometry of the design is mechanically achievable while respecting the Scheimpflug condition, since the plane of the eye was positioned at an angle with respect to the optical axis of the lens as described in J. P. Rolland, A. Yoshida, L. D. Davis, J. H. Reif, High-resolution inset head-mounted display, Applied Optics, Vol. 37, No. 19, July 1998.

The specifications and performance of the lens for both the display and eye tracking paths in this example are shown in the Table 2.

TABLE 2

| | DISPLAY | EYE-TRACKING |
|---|---|---|
| Working distances (conjugates) | OBJ distance: Infinity IMG distance: >24 mm (in order to allow enough room for the upper hot mirror) | OBJ distance: approx. 136 mm IMG distance: >24 mm but <35 mm (in order to maintain system compactness) |
| EFL | 33 mm | 33 mm |
| Full OBJ/IMG heights | OBJ height: 40° IMG height (display diagonal size): 24.6 mm | OBJ height: 35 mm (includes eye and lashes) IMG height: 11.2 mm (camera diagonal size) |
| Entrance pupil | 12 mm | 12 mm |
| Wavelength | Visible | 850 nm |
| MTF | >20% @ 35 lines/mm (given by the display pixel size) | >20% @ 70 lines/mm (given by the camera pixel size) |
| Distortion | <2% | <0.5% |
| Image plane | Kopin Micro-Display 24.6 mm diagonal 1280 × 1024 (pixel size 15 × 15 μm) | Hitachi KP-F120 Sensing Area: 8.98 × 6.71 mm Resolution: 1392 × 1040 Pixel size: 6.45 × 6.45 μm |

Figure 7:
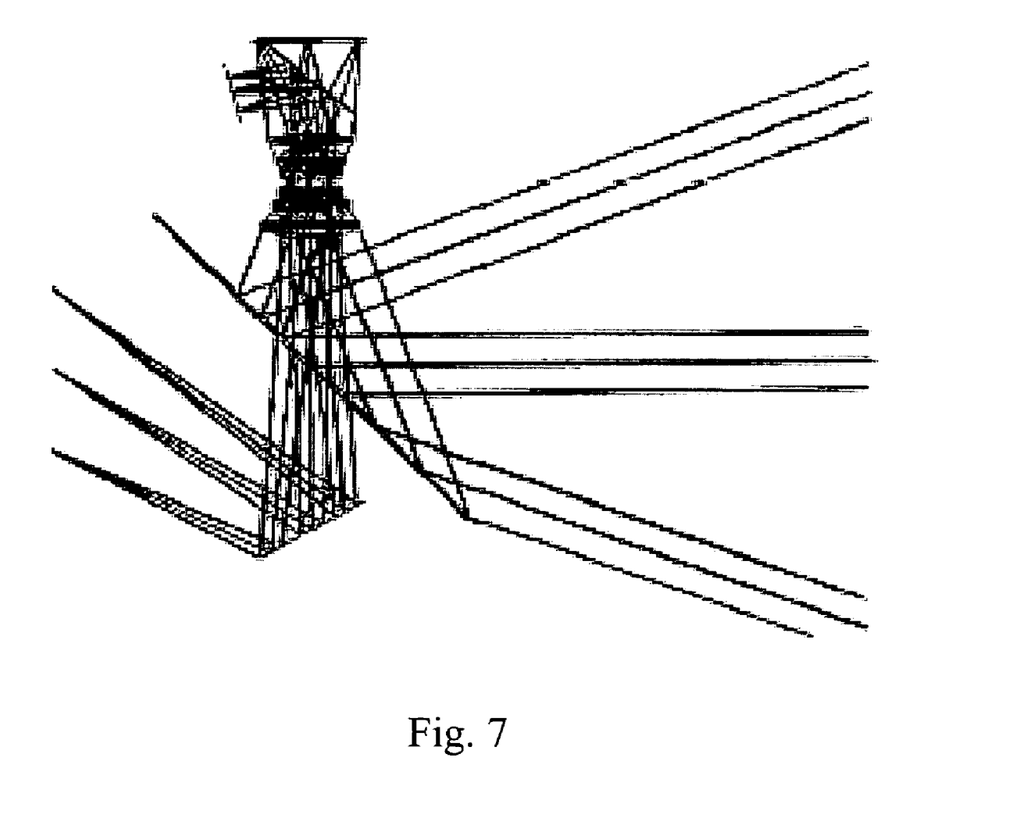
FIG. 7 shows the reflections of the optical system according to the present invention.

The 3D layout of the display path and the eye tracking path superimposed is shown in FIG. 7. In the preferred embodiment, a lens that weighs less than 9 grams and does not contain any aspheric or diffractive elements is selected.

Figure 8:
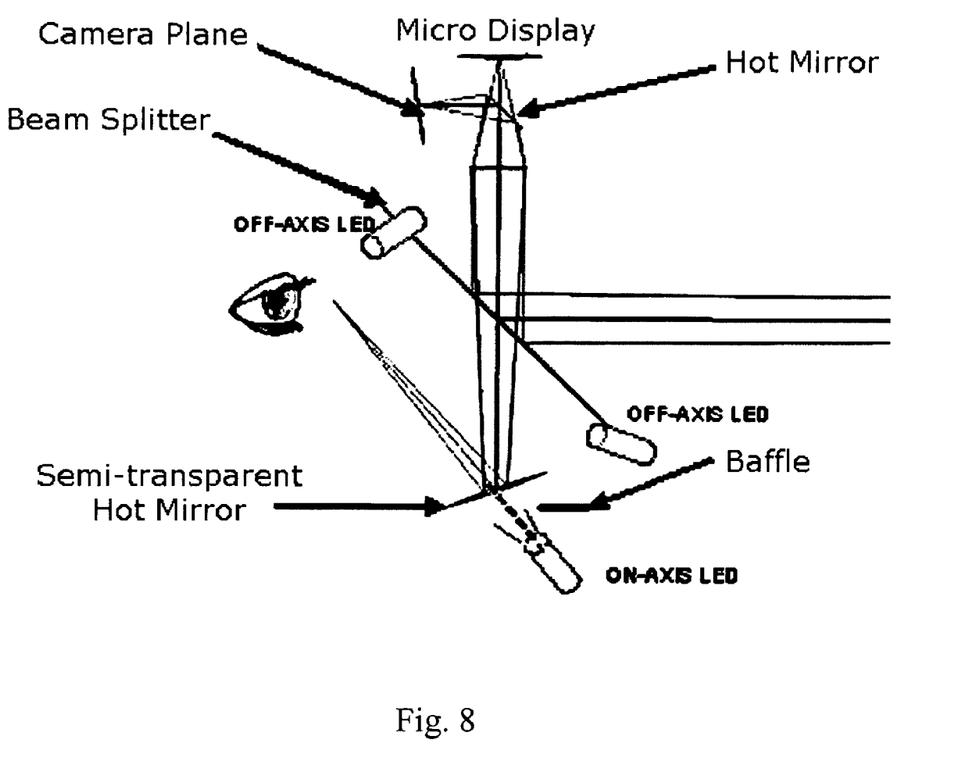
FIG. 8 show infrared light emitting diodes for "off-axis" illumination.
Figure 9:
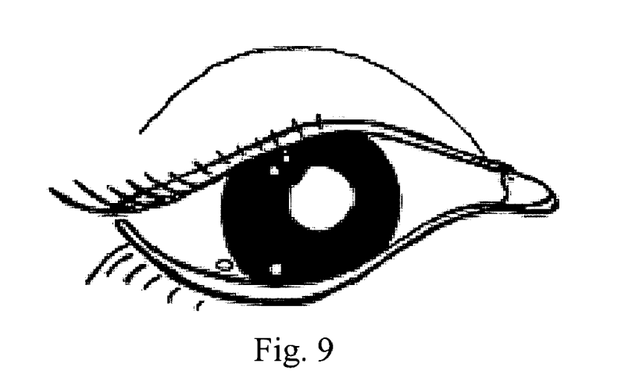
FIG. 9 shows a bright pupil obtained using a semi-transparent mirror.

To illuminate the eye for the eye-tracking process two illumination schemes using the dual light source technique are used as shown in FIG. 8. The system includes on-axis and off-axis illumination 305 and 315 respectively, two hot mirrors, a top hot mirror 300 and a bottom hot mirror 310, a camera 330 and a micro-display 340. One illumination setup is off-axis in order to achieve the dark pupil effect using off-axis LEDs 315 as shown. Four infrared LEDs (3 are shown) are mounted around the HMPD beam splitter 320. The LEDs are adjusted in angle and intensity in order to optimize the uniformity of the illumination and the location of the glints. The on-axis illumination is a little more problematic since the on-axis light source 305 is located on same axis as the camera plane 330, without obstructing the camera's field of view. Therefore, the bottom hot mirror 310 is semi-transparent, and illuminates the eye from "behind" the mirror 310 with the LED 305 positioned on the virtual extension of the camera axis. Initial results using this technique for obtaining bright pupil effect are shown in FIG. 9.

In summary, the present invention provides methods, systems, apparatus and devices for the lens design of an HMPD with eye-tracking capabilities. The integration uses a low-level optical configuration in order to achieve a compact, comfortable, easy-to-use system. The optical system is further designed and optimized for sharing of the optical path between the HMD and the Eye-Tracker with minimal performance loss for both tasks.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A projection-based head-mounted display device with an optical system inside the head-mounted display for eye-tracking capability, the optical eye tracking system comprising:
    multiple light sources for providing an infrared light to illuminate an eye of a user for creating multiple glints for use in detecting a polygon formed by the multiple glints, the multiple light source consisting of a dual light source for obtaining a bright pupil image and a dark pupil image of the eye, wherein the bright pupil image and the dark pupil image are subtracted to obtain a pupil of the eye for eye tracking;
    a camera for recording the multiple glints from the eye, the bright pupil image and the dark pupil image alternating with each frame taken by the camera;
    an optics for providing an optical path for a head-mounted display path and an eye-tracker path;
    a first and a second optical device for imaging the eye onto the camera, the optical device including a first and second hot mirror positioned in the eye-tracker path to reflect the infrared light and transmit a visible light;
    an interface for coupling an external controller with the head-mounted projection display for executing a set of instructions for controlling the projection-based head-mounted display device; and
    a display for displaying an image to the user, the display path shared with the eye eye-tracker path without obstructing the user's view, wherein the projection-based head-mounted display with eye-tracking capabilities built into the head-mounted device is compact, lightweight, comfortable and easy-to-use.

2. The display device eye tracking optical system of claim 1, wherein the dual light source comprises:
    an on-axis light source aligned with a semi-transparent second hot mirror, wherein a first infrared light from the on-axis light source is on the same axis as the camera to obtain the bright pupil image; and
    an off-axis light source aligned with the first hot mirror and having at least two infrared LEDs, wherein a second infrared light from the off-axis light source is off-axis from the camera to create at least three glints for the dark pupil image, wherein the bright pupil image and the dark pupil image alternate with each frame taken by the camera.

3. The display device eye tracking optical system of claim 2, wherein the optics includes:
    a beam splitter in a shared portion of both the head-mounted display path and the eye-tracker path.

4. The display device eye tracking optical system of claim 3, wherein each of the off-axis and the on-axis light sources comprises:
    a first and a second infrared light emitting diode mounted around the beam splitter inside the head-mounted display.

5. The display device eye tracking optical system of claim 2, wherein the set of instructions comprises:
    a set of pupil extraction instructions for synchronizing the camera and the light source for obtaining the bright pupil and dark pupil images and performing a subtraction of the two images to extract the pupil to remove the background to enable thresholding and artifact removal.

6. The display device eye tracking optical system of claim 1, wherein the optics include:
    an ideal lens module having a effective focal length to yield a diagonal full field of view of approximately 40 degrees for the head mounted projection display.

7. The display device eye tracking optical system of claim 6, wherein the effective focal length is approximately 33 mm.

8. The display device eye tracking optical system of claim 1, wherein the optics include:
a double Gauss lens scaled to have an effective focal length to optimize the head-mounted projection display path.

9. The display device eye tracking optical system of claim 8, wherein the effective focal length is approximately 33 mm.

10. The display device eye tracking optical system of claim 8, wherein the double Gauss lens has a weight of less than approximately 9 grams and does not contain aspheric or diffractive elements.

11. A method for providing eye-tracking inside a projection-based head-mounted display comprising the steps of:
providing plural infrared light beams from each of a first and a second different infrared light source for illuminating a pupil of a user's eye;
using an optical device to create a head-mounted display optical path and an eye-tracking optical path, wherein the optical display path and the eye-tracking optical paths are shared to reduce weight of the projection based head-mounted display;
using a first and second hot mirror coupled with the first and second light source, respectively, to image the eye onto a camera;
alternatingly recording multiple glints in a bright pupil image and a dark pupil image created by the at least two infrared light sources using the camera; and
extracting an eye movement data from the bright pupil image and the dark pupil image using a pupil/glint method.

12. The method of claim 11, wherein the eye movement extracting comprises the steps of:
creating plural glints in an eye of a user using the visible light transmitted by the first and second hot mirrors; and
calculating a centroid of the shape formed by the plural glints from the bright pupil image and the dark pupil image for tracking the eye movement.

13. The method of claim 11, further comprising:
using a first and a second infrared light source having a first and a second infrared light output, respectively;
positioning the first infrared light source and first hot mirror to create plural glints to provide a first infrared light on-axis with a point of view of the camera;
positioning the second infrared light source and a semi-transparent second hot mirror to provide a second infrared light off-axis with the point of view of the camera;
recording the bright pupil image and the dark pupil image of a user's eye using the camera, wherein the on-axis light source creates the bright pupil image and the off-axis light source creates the dark pupil image; and
subtracting the bright pupil image and the dark pupil image for use tracking eye movement, wherein the bright and the dark pupil images are synchronized to alternate with each frame taken by the camera to improve eye-tracking during rapid eye movement.

14. The method of claim 11, further comprising the step of:
simultaneously optimizing the optical device for the head-mounted display path and the eye-tracking path using a zoomed configuration.

15. The method of claim 14, wherein the optimizing step comprises the steps of:
adjusting respective wavelength weights for the head-mounted display path and the eye-tracking path according to a spectral eye response and a infrared wavelength; and
weighting an extended visible-infrared spectrum across the zoomed configuration to optimize obtain best balanced performance for both the head-mounted display path and the eye-tracking path.

16. The method of claim 11, wherein the using an optical device step includes the step of:
selecting a double Gauss lens having a weight of less than approximately 9 grams and not containing aspheric or diffractive elements.

17. A system for providing eye-tracking capabilities within a projection-based head-mounted display comprising:
a dual light source for providing a first and second infrared light, respectively;
an optical device to create a head-mounted display optical path and an eye-tracking optical path, wherein the head-mounted display and the eye-tracking optical paths are shared to reduce weight of the projection based head-mounted display, the optical device including a first and second hot mirror coupled with the first and second infrared light sources, respectively, for reflecting infrared light and transmitting visible to create plural eye glints for use detecting eye movement; and
a camera for recording the eye movement, wherein one source of the dual light source is on-axis and a second source of the dual light source is off-axis with the point of view of the camera; and
a processing device for executing a set of instructions to calculate a position of a pupil of the user's eye based on the eye movement extracted from a bright pupil image and a dark pupil image recorded by the camera.

18. The system of claim 17, wherein the set of instructions comprises:
a first subset of instructions for synchronizing the camera and the dual infrared light source;
a second subset of instructions for alternately obtaining and recording the bright pupil image and the dark pupil image and calculating a difference between the bright pupil image and the dark pupil image to extract the pupil, wherein the background is reduced to enable efficient thresholding and artifact removal.

* * * * *

UNITED STATES PATENT AND TRADEMARK OFFICE
CERTIFICATE OF CORRECTION

| | | |
|---|---|---|
| PATENT NO. | : 7,522,344 B1 | Page 1 of 1 |
| APPLICATION NO. | : 11/635989 | |
| DATED | : April 21, 2009 | |
| INVENTOR(S) | : Costin Curatu | |

It is certified that error appears in the above-identified patent and that said Letters Patent is hereby corrected as shown below:

Col. 1, lines 8-9, should read,

STATEMENT REGARDING FEDERALLY SPONSORED RESEARCH OR DEVELOPMENT

This invention was funded in part by the National Science Foundation, federal contract number HS/ IIS 03-07189.

Signed and Sealed this
First Day of March, 2011

David J. Kappos
*Director of the United States Patent and Trademark Office*